US012587577B2

(12) United States Patent　(10) Patent No.:　US 12,587,577 B2
Deb et al.　(45) Date of Patent:　Mar. 24, 2026

(54) METHODS AND SYSTEMS FOR MANAGING NETWORK RESOURCES

(71) Applicant: Avago Technologies International Sales Pte. Limited, Singapore (SG)

(72) Inventors: Prasun Deb, Telangana (IN); Partha Dutta, Telangana (IN); Sachin Suman, Telangana (IN); Jayakrishnan Udayavarma, Telangana (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/637,889

(22) Filed: Apr. 17, 2024

(65) Prior Publication Data

US 2025/0330508 A1　Oct. 23, 2025

(51) Int. Cl.
　*H04L 65/613*　(2022.01)
　*H04L 65/1093*　(2022.01)
　*H04L 65/1095*　(2022.01)
　*H04L 65/1101*　(2022.01)

(52) U.S. Cl.
　CPC ........ *H04L 65/613* (2022.05); *H04L 65/1093* (2013.01); *H04L 65/1095* (2022.05); *H04L 65/1101* (2022.05)

(58) Field of Classification Search
　CPC ............... H04L 65/613; H04L 65/1093; H04L 65/1095; H04L 65/1101
　USPC ........................................................ 709/224
　See application file for complete search history.

(56) References Cited

U.S. PATENT DOCUMENTS

| | | | |
|---|---|---|---|
| 2009/0049175 A1* | 2/2009 | Finn ........................ | H04L 47/83 709/226 |
| 2019/0238441 A1* | 8/2019 | Götz ....................... | H04L 12/40 |
| 2022/0345417 A1* | 10/2022 | Kasichainula .......... | H04L 47/30 |

OTHER PUBLICATIONS

Imtiaz, J. et al., A Proposal to Integrate Process Data Communication to IEEE 802.1 Audio Video Bridging (AVB), 2011 IEEE 16th Conference on Emerging Technologies & Factory Automation (ETFA), IEEE, 2011, 8 pages.
Teener, M. et al., Heterogeneous Networks for Audio and Video: Using IEEE 802.1 Audio Video Bridging, Proceedings of the IEEE, 2013, 101(11):2339-2354.
European Patent Office, Extended Search Report, Application No. 25170893.9, May 20, 2025, 10 pages.

* cited by examiner

*Primary Examiner* — Karen C Tang
(74) *Attorney, Agent, or Firm* — Quarles & Brady LLP

(57) ABSTRACT

This invention is directed to network methods and systems. According to an embodiment, the present invention provides a method that includes receiving a plurality of streams, each containing audio or video content. The method includes determining and storing separate statuses and states for these streams based on their association with network ports. The method manages the network resources associated with the streams based on their status. There are other embodiments as well.

20 Claims, 11 Drawing Sheets

700

| MSRP Application |
| 705 |

| MSRP Stream Management |
| 707 |

| Active Stream |
| 708 |

| Passive Stream |
| 709 |

| Port Bandwidth Management & MFDB Allocation |
| 710 |

| MRP |
| 706 |

| Registrar State Machine |
| 711 |

| Applicant State Machine |
| 712 |

| Hardware Abstraction Layer |
| 704 |

| Switch |
| 701 |

| talker ports |
| 703 |

| listener ports |
| 704 |

METHODS AND SYSTEMS FOR MANAGING NETWORK RESOURCES

FIELD OF INVENTION

The present invention is directed to network systems.

BACKGROUND OF THE INVENTION

Modern networks handle diverse data streams, including audio and video streams, which are essential for various applications, from video conferencing to streaming services. Managing these streams effectively is critical for ensuring high-quality transmission and avoiding lags or disruptions, which are important for user experience and service reliability. Audio Video Bridging (AVB) comprises specific standards tailored for synchronizing and managing audio and video data over networks. For example, ABV standards include IEEE 802.1AS, IEEE 802.1Qav, IEEE 802.1BA, IEEE 1722-2011, and others. These standards ensure that such data is transmitted in a coordinated and timely manner, vital in settings like live performances or broadcasting, where precise audio-video alignment is crucial for quality delivery.

Unfortunately, existing technologies are inadequate, for the reasons explained below. New and improved methods and systems are desired.

DETAILED DESCRIPTION OF THE INVENTION

Figure 1:
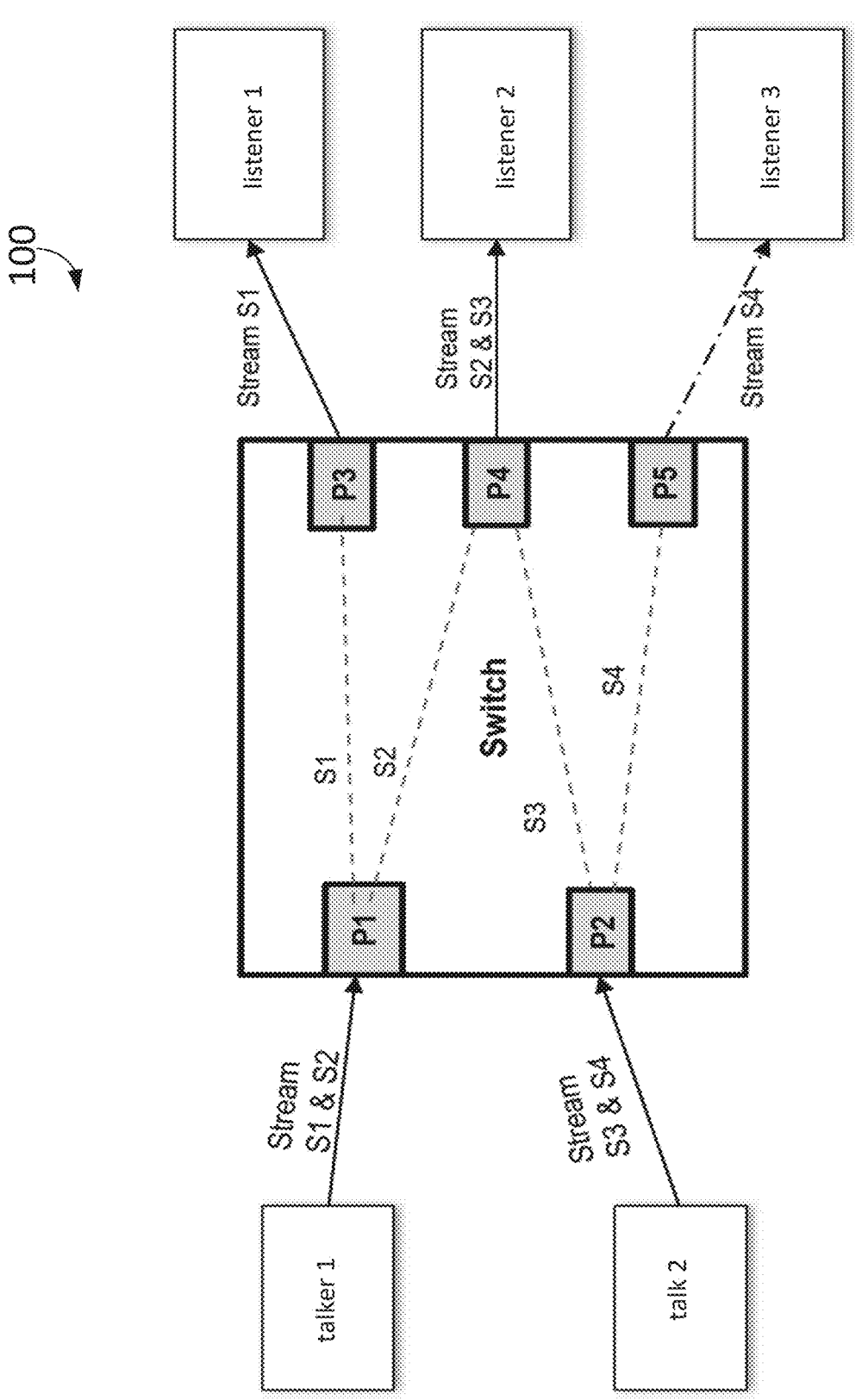
FIG. 1 is a simplified diagram illustrating network system 100 according to embodiments of the present invention.

This invention is directed to network methods and systems. According to an embodiment, the present invention provides a method that includes receiving a plurality of streams, each containing video content. The method includes determining and storing separate statuses and states for these streams based on their association with network ports. The method manages the network resources associated with the streams based on their status. There are other embodiments as well.

As mentioned above, existing network techniques are inadequate. For example, in existing approaches for AVB networks, managing a large number of audio and video streams, particularly passive ones without active listeners, poses significant challenges in scalability and efficiency. Each stream requires individual monitoring and resource allocation, leading to a high processing burden. For example, an AVB network refers to a network architecture that facilitates synchronization, scheduling, and transport of audio and video streams over network connections.

The subject disclosure, in various embodiments, tackles these issues by distinguishing between active streams that have listeners and passive streams that do not. For example, a process may group passive streams into a single entity for management purposes, which reduces the complexity and processing demands on the network, enabling it to handle more streams efficiently. As a result, the network's scalability is enhanced, and its performance is streamlined, optimizing the use of resources and improving overall network functionality.

The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

FIG. 1 is a simplified diagram illustrating network system 100 according to embodiments of the present invention. This diagram is merely an example, which should not unduly limit the scope of the claims. One of ordinary skill in the art would recognize many variations, alternatives, and modifications.

Network system 100, as an example, comprises an Audio-Video Bridging (AVB) network, which includes three types of components: devices that transmit audio or video streams (talkers), devices that receive these streams (listeners), and AVB Capable Switches facilitating communication between talkers and listeners. For example, in AVB terminology, the term "listener" refers to a device or system receiving AVB audio or video streams, and the term "talker" refers to a device or system transmitting these streams. As an example, the term "listener port" refers to a communication interface receiving, among others, AVB audio or video streams, and the term "talker port" refers to a communication interface for transmitting, among others, AVB audio or video streams. A device may function both as a talker and a listener, depending on the situation (e.g., a device functions as a talker when transmitting a stream, and it functions as a listener when receiving a stream). For example, both talkers and listeners support 802.1AS and Multiple Stream Reservation Protocol (MSRP) for synchronized streaming and resource reservation. For example, MSRP is a protocol used within AVB networks to manage and reserve network resources for audio and video streams. For example, in an AVB network, a stream is a connection between a talker and one or more listeners, and it includes a fixed number of video and audio channels at a fixed sample rate. As a part of the stream format for the AVB network, states may include information such as connection status, stream format, and others. For example, each of the streams includes a definition, which includes destination MAC, stream identification, traffic specification about bandwidth requirement, and/or others.

In FIG. 1, a plurality of streams may be received from one or across multiple talker devices. For example, ports P1 to P5 may be configured for 802.1AS and MSRP, serving as MSRP Core ports. In various embodiments, network system 100 utilizes Multiple VLAN Registration Protocol (MVRP) to determine a dedicated virtual local area network (VLAN) for carrying audio-video traffic from talkers to listeners via the Switch. For example, MVRP is configured to assign a dedicated VLAN for the specific purpose of carrying audio-video traffic efficiently from talkers (devices transmitting AVB streams) to listeners (devices receiving AVB streams) through the Switch. The dynamic VLAN assignment, facilitated by MVRP, allows for streamlined and organized traffic flow, which helps maintain high-quality audio and video streaming in the network. Stream mapping can be configured in various ways. For example, one talker to one listener (1:1) or one talker to multiple listeners (1:N) may be provided. Each stream may, for example, be defined by attributes such as Destination MAC, Stream ID, Traffic Specification (TSpec, which details bandwidth requirements for the stream), or others.

In some approaches, each AVB-capable port may be tasked with tracking and maintaining the state of all streams, regardless of whether they have an active listener. This requirement exists because a listener may decide to join any stream at any time. Consequently, listener ports and talker ports maintain states for multiple streams. However, this may lead to inefficient use of resources, particularly when multiple talker devices are present, each advertising several streams, resulting in a significant number of AVB streams, with each AVB-capable switch port maintaining the state of each stream individually. This approach creates substantial processing overhead, especially during the leave-all process, a bi-directional communication event for garbage collection occurring every 10 seconds by default. For example, the leave-all process involves refreshing stream attributes and processing MSRP PDUs (Protocol Data Units) within a limited time frame, making it a complex and resource-intensive operation when many streams are involved. For example, the term "refresh" refers to a process within an AVB network where the state of each stream is updated and reconfirmed, and it may involve re-establishment of current stream attributes and the processing of MSRP Protocol Data Units (PDUs) within a set time frame, typically to ensure that all streams are accurately synchronized and that network resources are efficiently allocated. Therefore, it is to be appreciated that according to various embodiments of the present invention, passive streams are identified and their states are aggregated, as further described below. As an example, the term "port" refers to an interface on a device in a network through which data is received, sent, or managed. Depending on the implementations, a port may be configured to handle various types of communications and protocols, facilitating the transmission of data streams, such as audio and video streams, across the network.

Figure 2:
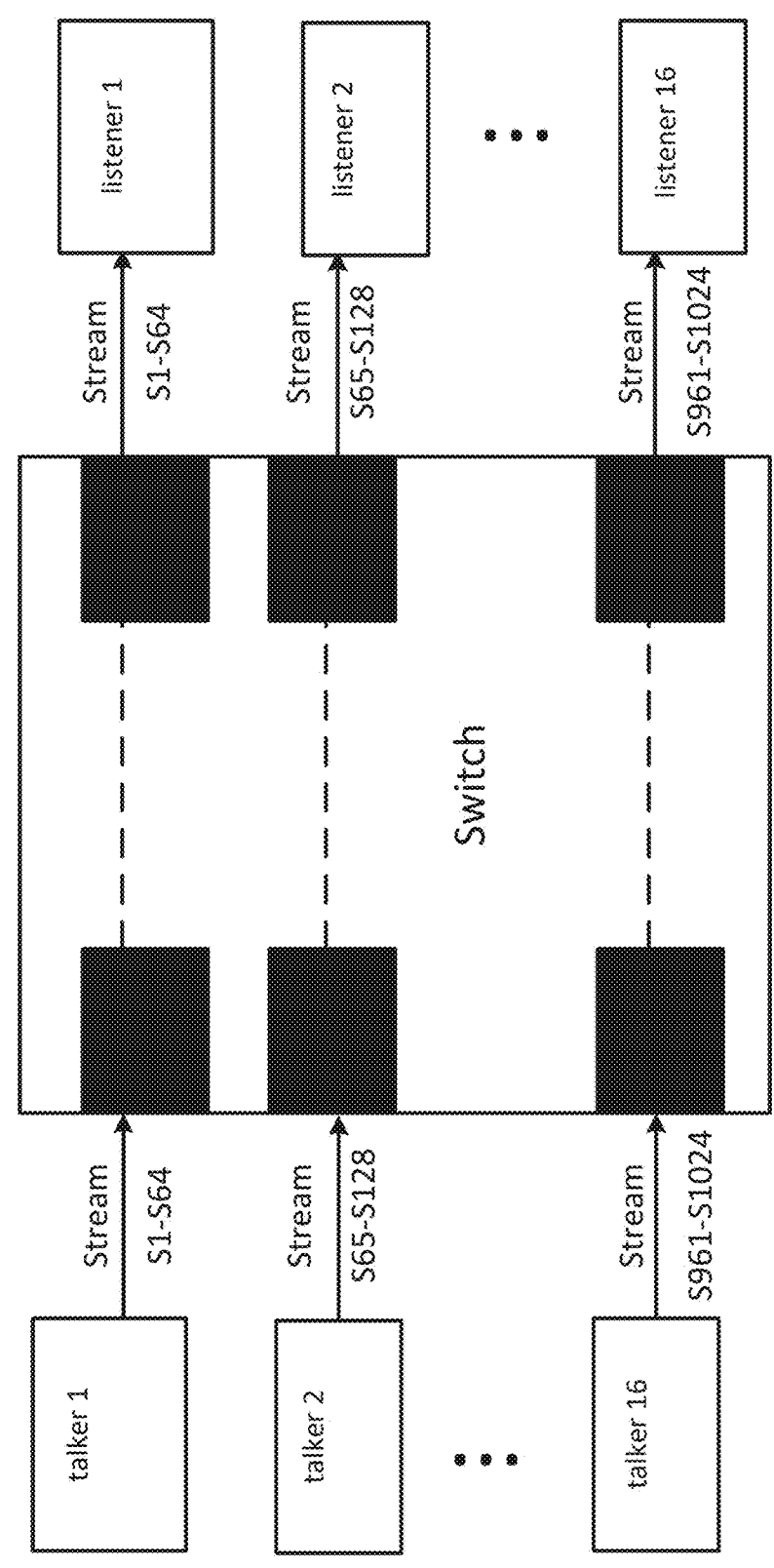
FIG. 2 is a simplified diagram illustrating network system 200 according to embodiments of the present invention.

FIG. 2 is a simplified diagram illustrating network system 200 according to embodiments of the present invention. This diagram is merely an example, which should not unduly limit the scope of the claims. One of ordinary skill in the art would recognize many variations, alternatives, and modifications.

As an example, network system 200 is configured as an AVB network with 1,000 AVB streams, where 16 talkers each advertise 64 streams, and 16 listeners each register for 64 streams. It is understood that network system 200 may include different numbers of AVB streams, depending on the implementations. Network system 200 is configured with one-to-one mapping between talkers and listeners for all streams. At the switch (or bridge), ports are burdened with maintaining more than the 64 streams they directly handle. For instance, a talker port like P1, while only actively dealing with 64 talker streams, declares and maintains states for an additional 960 streams. Similarly, a listener port like P17, though it has only 64 active listener registrations, needs to maintain states for all 1024 streams. This example highlights the substantial load and complex state management that switches and bridges must handle in such a network. It is to be appreciated that embodiments of the present invention aggregate listening ports (e.g., for P17, it only needs to maintain 65 states, which includes 64 active listener registrations and an aggregate state for all the passive streams).

Figure 3:
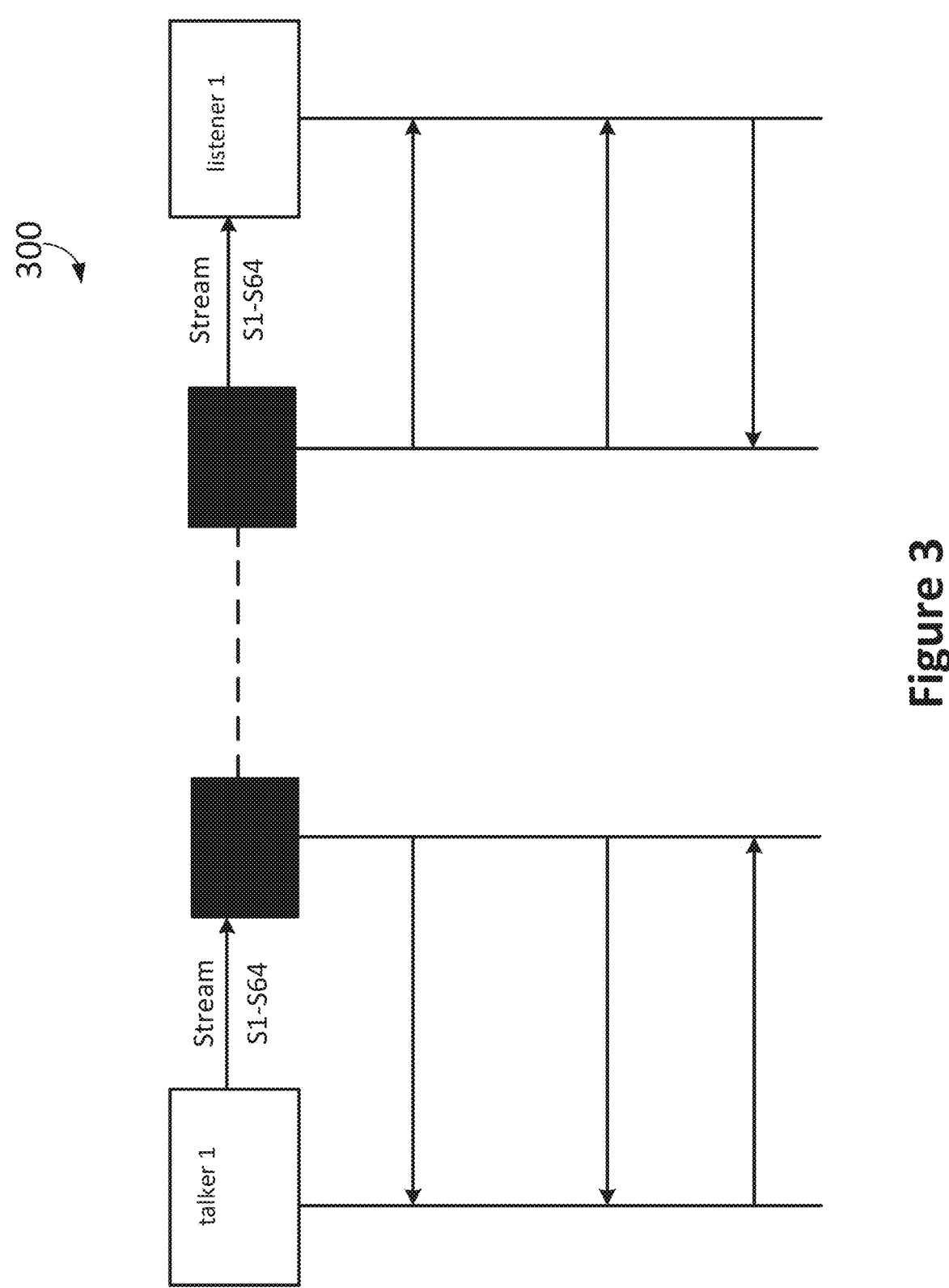
FIG. 3 is a simplified timing diagram 300 illustrating operation of network ports according to embodiments of the present invention.

FIG. 3 is a simplified timing diagram 300 illustrating the operation of network ports according to embodiments of the present invention. This diagram is merely an example, which should not unduly limit the scope of the claims. One of ordinary skill in the art would recognize many variations, alternatives, and modifications. As illustrated in FIG. 3, ports P1 and P17 maintain states for 960 talker streams that are not registered on these ports. To maintain these streams, MSRP creates multiple registration protocol (MRP) attributes for each of these 960 streams that, in turn, go through their individual Registrar and Applicant State Machine in MRP. For example, in AVB networks, MRP is used to declare attributes to be registered in a database on each bridge port. For example, AVB network detects and modifies various AVB network parameters, including MRP attributes. A leave-all process, in some approaches, needs to handle each of these 960 streams to be declared along with the 64 active/registered streams. The process repeats for all 16 talker ports+all 16 listener ports, which requires a lot of processing at MSRP. Additionally, the entire leave-all process also needs to be completed within the boundary of Leave-Timer for all these ports. For example, a "Leave-Timer" in an AVB network refers to a predefined time interval within which a leave-all process must be completed on network ports. Maintaining states for 1024 (e.g. 16 talkers at 64 streams per talker) or more attributes at each port level (P1 to P32) and keeping up with the leave-all process to declare all the relevant attributes/streams and process response from peers is the CPU/software processing overhead that creates a significant scalability challenge for network switches and bridges. By aggregating states for passive streams, processing overload is significantly reduced according to various embodiments of the present invention.

According to various embodiments, managing data streams within AVB networks involves distinguishing and management of active and passive streams, thereby optimizing network efficiency by effectively handling the varying quantities of data streams across AVB-capable ports. In some implementations, given that each listener device is interested in a subset of the available streams, the plurality of streams at each listener port may be processed to identify the active streams from the passive streams. To manage active and passive streams differently, it first needs to identify active and passive streams. Usually, at an AVB-capable port, the active streams are considerably fewer than the total number of streams. The majority of the streams are inactive, not requiring immediate attention or resources. For example, each listener port is involved with the management of a limited number (approximately 64) of active streams. In real-world applications, a significantly larger proportion (e.g., around 960 streams or 93% of the total), remain inactive at a given time. These are streams not currently associated with any registered listeners. On a talker port, streams originating from other talkers that are not actively engaged are categorized as passive.

In a process to differentiate active and passive streams, for a given talker-to-listener pathway, the streams are classified into active and passive categories. As an example, the classification may be implemented as below:

S1-S64: Active Streams (talker Registered, listener Declared-R.Adv-D.Ready)

S65-S1024: Passive Streams (Declared-D.Adv)

An advantage of differentiating active and passive ports is the substantial reduction in processing overhead. By categorizing the majority of the streams as passive (i.e., no registered listener port), a network effectively reduces the amount of resources to manage each stream individually. This leads to a streamlined process, where passive streams are treated collectively as a single entity at each port, enhancing the network's efficiency and scalability by focusing resources and management efforts on the active streams that require immediate attention.

In the context of listener and talker ports, the network continuously monitors for active subscriptions to determine stream status. For example, the term "subscription" refers to an action or status where a device in the network formally requests, accepts, or is allocated access to specific resources or data streams, which may include mechanisms such as registering to receive updates, joining a data stream, or making configuration changes to ensure the continuous reception of a data stream (e.g., a video stream). For example, streams with at least one listener port subscription are deemed active and managed accordingly. Streams without any listener port subscriptions are classified as passive. The classification allows for efficient resource allocation, where active streams are prioritized for immediate network support, while passive streams are managed with reduced immediacy, thus conserving network resources. For example, in a network setup where Stream S4 is connected to listener-3, Stream S4 is marked as active. Conversely, streams without any listener port connections are deemed passive, indicating minimal or no immediate resource allocation. Efficient management of network resources helps AVB networks scale effectively while maintaining high-performance levels for active streams.

Figure 4:
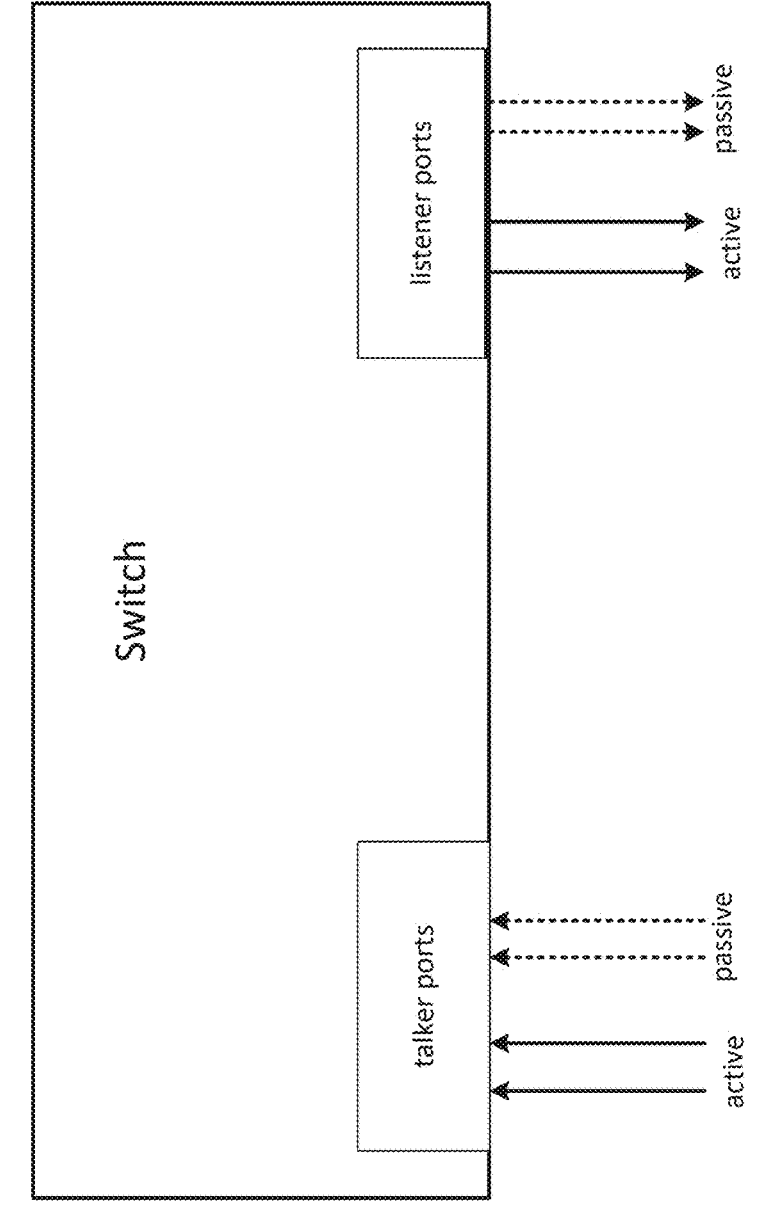
FIG. 4 is a simplified diagram illustrating switch 400 according to embodiments of the present invention.

FIG. 4 is a simplified diagram illustrating switch 400 according to embodiments of the present invention. This diagram is merely an example, which should not unduly limit the scope of the claims. One of ordinary skill in the art would recognize many variations, alternatives, and modifications. For example, the term "switch" refers to a network device that, among other things, connects various components within a network (e.g., an AVB network). A switch may be configured to facilitate the routing and management of data streams between these various components, which may include talker ports and listener ports handling both active and passive streams. In various implementations, switch 400 is AVB capable and it includes talker ports and listener ports as shown. For example, talker ports as shown include two incoming active streams and two incoming passive streams. listener ports in FIG. 4 comprise two outgoing active streams and two outgoing passive streams. For example, "talker ports" and "listener ports" may refer to a collection of ports. In various embodiments, MRP stream attributes in AVB networks are optimized for a state machine at the port level, where all the passive streams at a port may be stored with a single MRP attribute, rather than individual attributes for each stream. For example, the passive streams at talker ports and listener ports are stored in a single MRP attribute (e.g., passive or inactive). In an implementation, all passive streams at a port are collectively represented by one MRP Attribute. This differentiation between active and passive streams reduces the number of MRP Attributes required for state management on a given switch/bridge port.

Using streams S1-S64 from FIG. 3 as an example, active streams (S1-S64) are streams where the talker is registered, and the listener is declared, categorized under a status of 'talker Registered, listener Declared' (R.Adv-D.Ready). Passive streams (S65-S1024) represent the bulk of the streams, these are characterized by a status of 'Declared' (D.Adv) but are inactive in terms of current network resource utilization. By aggregating the attributes of passive streams, a state machine (including both Registrar and Applicant states) for a port now manages significantly fewer streams. MRP attributes for active streams include 64 states (one for each active stream), and MRP Attribute for passive streams is reduced to 1 state (e.g., a single state representing 960 passive streams). The total MRP attributes are now reduced to 65 states. Compared to existing approaches of managing 1024 individual MRP attributes for the same number of streams, embodiments of the present invention significantly reduce resources associated with stream management. Managing passive stream states through a unified MRP attribute helps enhance the efficiency and scalability of the AVB network. For example, by reducing the complexity of state management and optimizing resource allocation, the network can handle a large number of streams more effectively, thus improving overall performance. In various implementations, when a passive stream becomes active, the system is configured to dynamically allocate appropriate resources, treating it as an individual active stream.

Figures 5A, 5B:
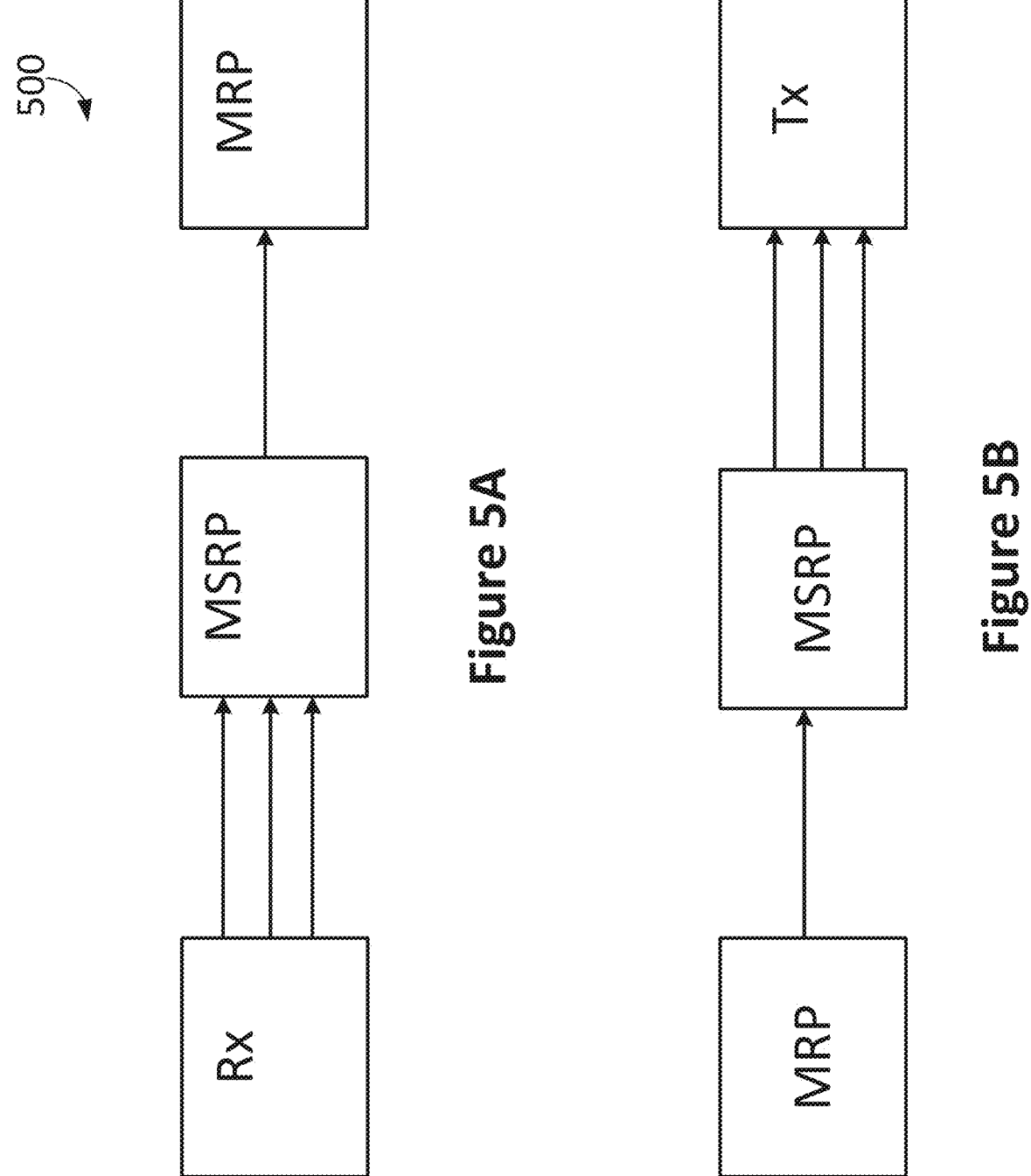
FIGS. 5A and 5B are simplified diagrams illustrating resource allocation according to embodiments of the present invention.

FIGS. 5A and 5B are simplified diagrams illustrating resource allocation according to embodiments of the present invention. These diagrams merely provide an example, which should not unduly limit the scope of the claims. One of ordinary skill in the art would recognize many variations, alternatives, and modifications. As shown in FIG. 5A, passive streams received at "Rx" are consolidated into a single state or attribute MSRP block, and the MRP block only needs to manage the single state or attribute representing all the passive streams. For example, the consolidated attribute or state may be maintained in both registrar and applicant states, simplifying the overall management process.

In FIG. 5B, the MSRP block uniquely maps a single MRP attribute to all passive streams. For instance, it could represent a large number, such as 960 Passive streams, with just one attribute. This approach allows the MSRP to efficiently process events related to a vast number of streams collectively. As a result, MSRP receives a single event from MRP for all passive streams, enabling it to act for all these streams as one collective group. In contrast, in some approaches, each stream is associated with an individual attribute within the MRP state machine, thereby sacrificing implementation efficiency and flexibility.

According to various embodiments, when a listener-ready Protocol Data Unit (PDU) is received for a passive stream on a port from a listener, the stream transitions into an active state on that port. Subsequently, a new MRP attribute is created for this newly active stream, and the port removes this stream from its list of passive streams. This process streamlines the transition between active and passive states, and ensures that resources are allocated efficiently and dynamically according to the network's current needs.

Figure 6:
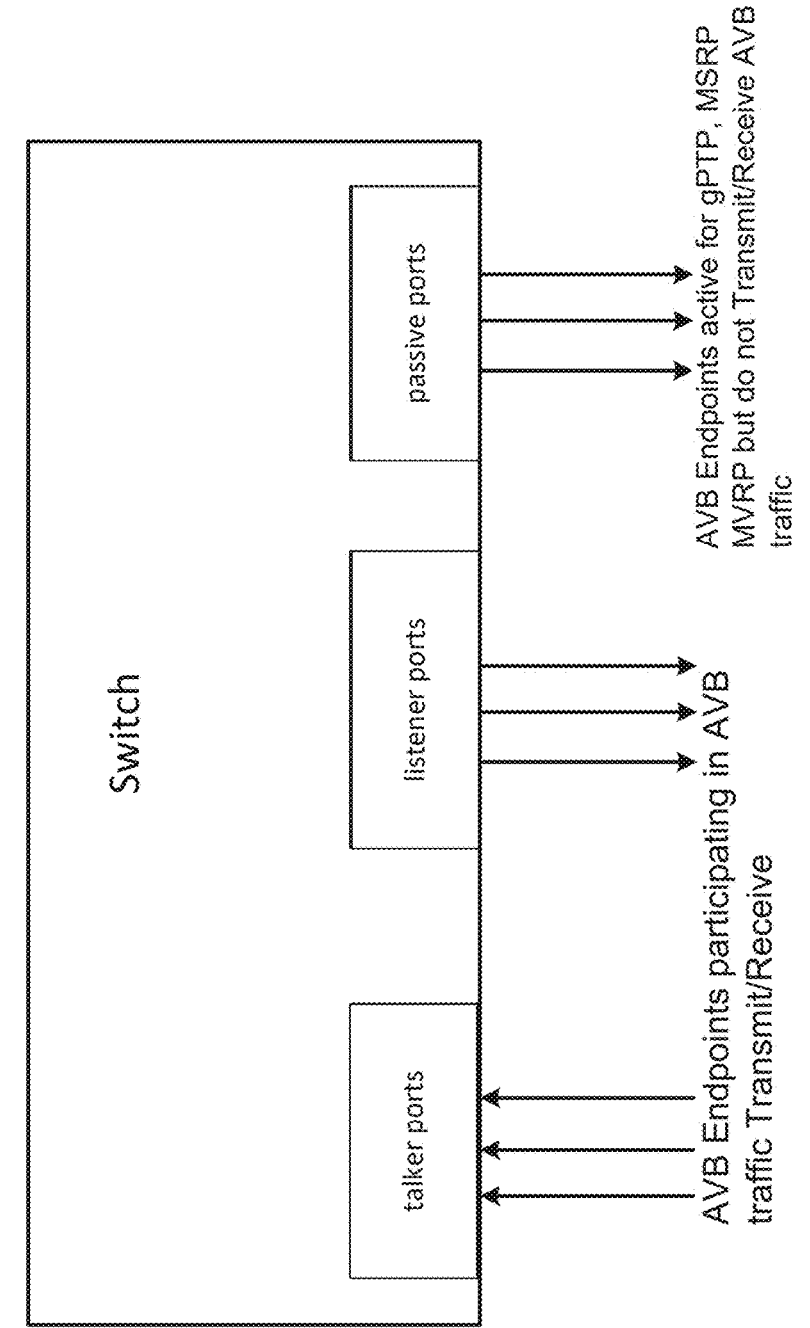
FIG. 6 is a simplified diagram illustrating switch 600 according to embodiments of the present invention.

FIG. 6 is a simplified diagram illustrating switch 600 according to the embodiments of the present invention. This diagram is merely an example, which should not unduly limit the scope of the claims. One of ordinary skill in the art would recognize many variations, alternatives, and modifications. As an example, the Passive ports shown in FIG. 6 may be configured as fully AVB capable, but they do not engage in the transmission or reception (Tx/Rx) of AVB streams. Passive ports can be identified as AVB-enabled ports that are not actively participating in AVB stream transactions. A talker port or listener port can transition into a passive port when it ceases to have any active listeners. For example, a passive port may be characterized by its role in forwarding talker advertisements without having any listeners subscribed to any of the talker streams it manages.

Passive ports may be configured with simplified attribute management. For example, a single aggregated attribute is maintained by the MSRP for passive ports, thereby significantly reducing the complexity of state management, and the aggregated attribute helps sustain the "leave-all" function within the MRP state machine. In various implementations, the Passive ports in FIG. 6 maintain only one state for all streams it encompasses. During the execution of a Leave-All event, all stream attributes associated with the passive port are collectively declared and transmitted to their corresponding peer. By reducing the number of active states that need to be managed for ports without active listeners, the network can operate more efficiently and with reduced resource overhead. The aggregated attribute management for passive ports and passive streams simplifies the network's operational complexity, particularly beneficial in scenarios involving a large number of streams and ports. This configuration allows for more effective and streamlined network performance, especially in large-scale AVB deployments.

Figure 7:
FIG. 7 is a simplified block diagram illustrating system 700 for operating an audio video bridging network according to embodiments of the present invention.

FIG. 7 is a simplified block diagram illustrating system 700 for operating an audio-video bridging network according to embodiments of the present invention. This diagram is merely an example, which should not unduly limit the scope of the claims. One of ordinary skill in the art would recognize many variations, alternatives, and modifications. As an example, various functional blocks may be implemented using one or more hardware components, and a hardware component (e.g., processor) may be used to implement more than one functional block.

System 700 includes switch 701, which includes both talk port 703 and listener port 702. For example, switch 701 may be configured to perform the functions of switch 600 in FIG. 6, where passive streams are processed by "passive ports" and managed using an aggregate attribute. Various functions, such as managing streams and stream attributes, are managed by MSRP block 705 and MRP block 706, via hardware abstraction layer 704. As shown MSRP block 705 includes MSRP stream management block 707, which manages active stream 708 and passive stream 709. MSRP application block 705 also includes port bandwidth block 710, as shown. MRP block 706, as shown, includes registrar state machine 711 and applicant state machine 712. More specifically, streams that are identified as "passive", as explained above, are managed using an aggregate attribute, and system 700 does not individually manage passive streams.

System 700 includes switch 701, which includes talker ports 703 and listener ports 702. For example, the switch configuration is designed to perform functions switch 600, as depicted in FIG. 6). In various embodiments, passive streams are processed and managed using an aggregate attribute, which simplifies the stream management process in AVB networks.

In various embodiments, various functions within the system, such as stream management and attribute handling, may be carried out by the Multiple Stream Reservation Protocol (MSRP) block 705 and the Multiple Registration Protocol (MRP) block 706, operating via a hardware abstraction layer 704, which serves as an interface, connecting physical hardware components to software-based control mechanisms.

At MSRP Block 707, the MSRP stream manage block 707 may configured for oversight of both active stream 708 and passive stream 709. The MSRP application block 705 further incorporates a port bandwidth block 710, which aids in the efficient allocation and management of network bandwidth across various ports. MRP Block 706 includes registrar state machine 711 and the applicant state machine 712. For example, the state machines are configured to maintain the state and status (e.g., stored as attributes) of streams and ensure streamlined processing within the network.

It is to be appreciated that system 700, through the management of passive streams with an aggregate attribute, can efficiently utilize valuable network resources, without overtaxing MSRP and MRP blocks.

Figure 8:
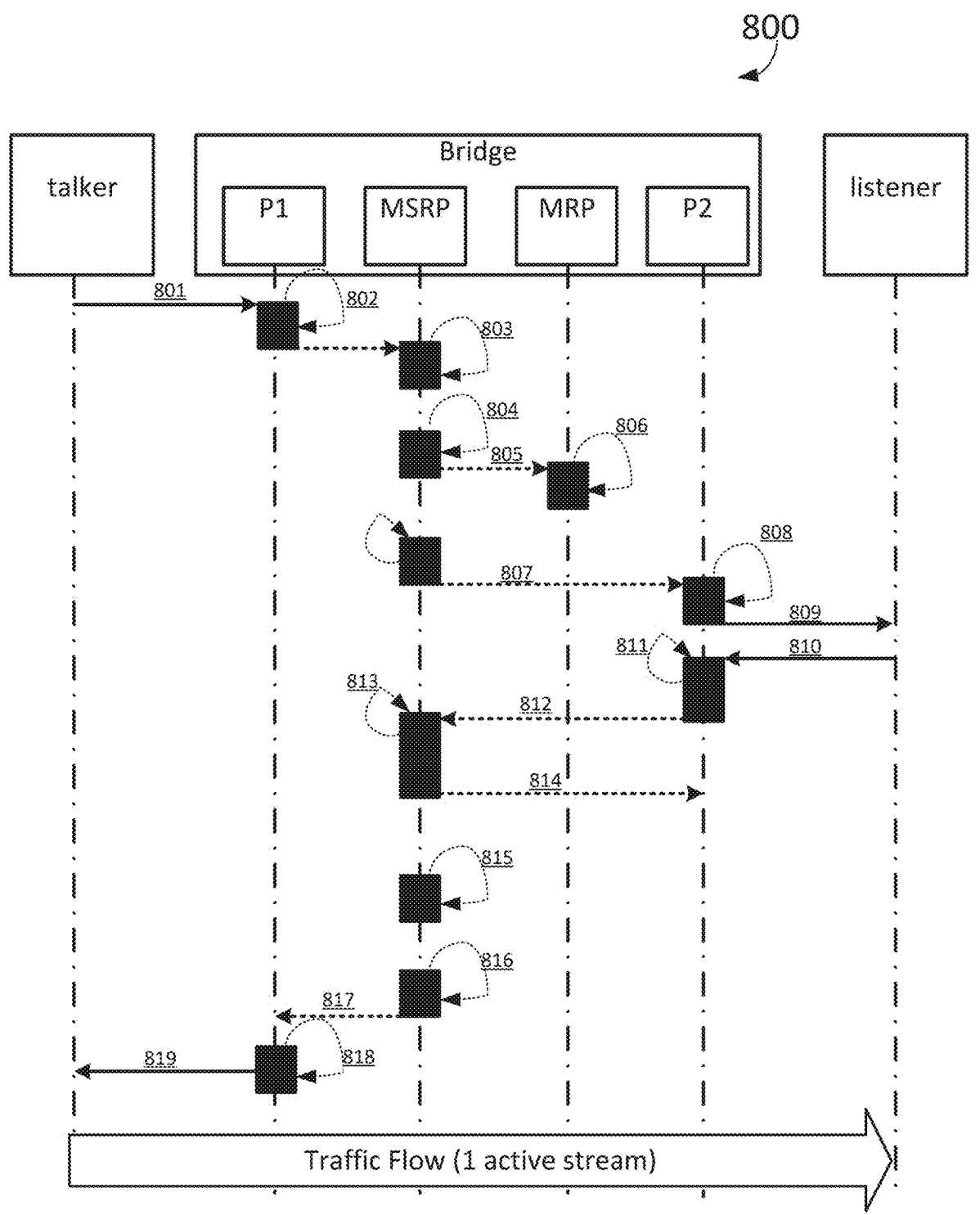
FIG. 8 is a simplified diagram illustrating process 800 of operating with an active stream according to embodiments of the present invention.

FIG. 8 is a simplified diagram illustrating process 800 of operating with an active stream according to embodiments of the present invention. This diagram is merely an example, which should not unduly limit the scope of the claims. One of ordinary skill in the art would recognize many variations, alternatives, and modifications. For example, process 800 illustrates traffic flow of one active stream that involves declaring talker, with listener joining. As an example, one or more steps in process 800 may be added, removed, repeated, rearranged, modified, replaced, and/or overlapped, which should not unduly limit the scope of claims.

At step 801, talker sends out advertisements (e.g., n streams).

At step 802, a packet data unit (PDU) is received at port P1, using MSRP.

At step 803, the MSRP block determines that the n streams sent from talker are passive streams (e.g., streams that are not subscribed by any listener ports, at least initially).

At step 804, the MSRP block generates an aggregated MRP attribute for the n passive streams.

At step 805, the aggregate MRP attribute is registered at the MRP block.

At step 806, the aggregated attribute is declared for the n passive streams for port P2 (e.g. with n attribute registration for port P1)

At step 807, talker propagation is provided for all n streams (e.g., transmitted to port P2).

At step 808, a PDU is transmitted using MSRP.

At step 809, talker advertisement of N streams is received by listener, as shown.

At step 810, listener indicates that is it ready for one stream, which makes that stream active.

At step 811, PDU from listener is received at port P2, under MSRP.

At step 812, information associated with the active stream is received at MSRP block.

At step 813, MSRP block identifies one active stream and n−1 passive streams (one of the passive streams became an active stream after being subscribed by listener, at step 809).

At step 814, MSRP block registers the active stream at MRP block.

At step 815, MSRP block performs bandwidth management and resource allocation for the active stream.

At step 816, listener states are merged (e.g., based on active or passive status).

At step 817, listener and attribute are propagated from MSRP block to port P1.

At step 818, a PDU is transmitted from port P1 with MSRP.

At step 819, listener and the active stream are declared to talker. A traffic flow of a single active stream between talker and listener is established.

Figure 9:
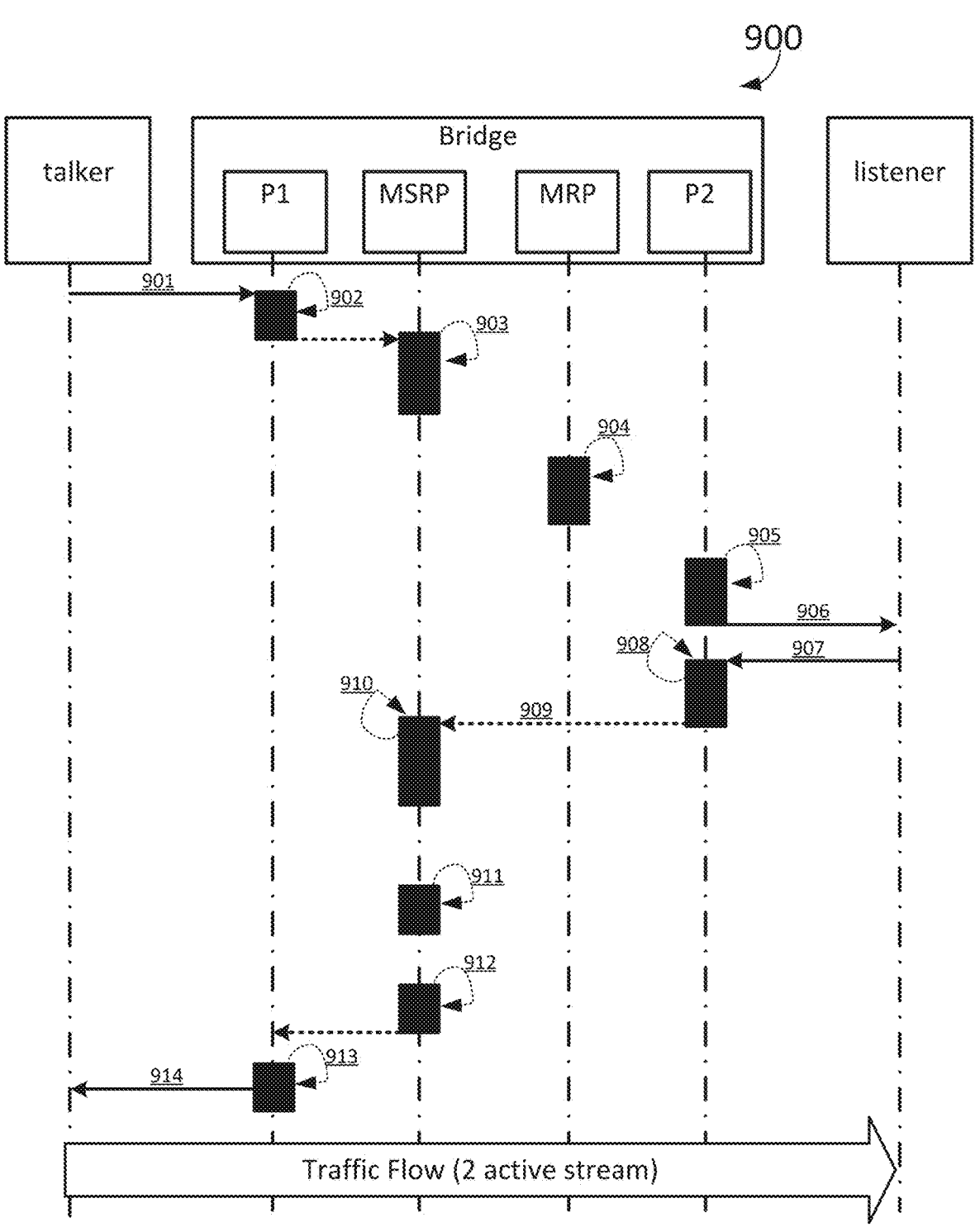
FIG. 9 is a simplified diagram illustrating process 900 that involves transitioning from passive stream to active stream according to embodiments of the present invention.

FIG. 9 is a simplified diagram illustrating process 900 of transitioning from passive stream to active stream according to embodiments of the present invention. This diagram is merely an example, which should not unduly limit the scope of the claims. One of ordinary skill in the art would recognize many variations, alternatives, and modifications. For example, process 900 illustrates traffic flow of two active streams involving transitioning from passive stream to active stream. In various implementations, a transition between active and passive streams may be determined. As an example, one or more steps in process 800 may be added, removed, repeated, rearranged, modified, replaced, and/or overlapped, which should not unduly limit the scope of claims.

At step 901, talker advertises n streams.

At step 902, a PDU (e.g., related to the n streams) is received at port P1 with MSRP.

At step 903, MSRP block identifies an active stream, and n−1 passive streams.

At step 904, MRP block has two attributes to declare to port P2. One attribute is for the active stream, and the other attribute is an aggregate attribute for the n−1 passive streams.

At step 905, an MSRP PDU is transmitted from port P2.

At step 906, talker advertisement for the n stream is transmitted from port P2 to listener.

At step 907, listener indicates that it is ready for a second active stream.

At step 908, an MSRP PDU is received at port P2.

At step 909, information related to the second active stream is transmitted from port P2.

At step 910, MSRP block updates for two active streams and n−2 passive streams (e.g., n−1 passive stream becomes n−2 passive streams after one of the passive streams changes to an active stream).

At step 911, MSRP block provides bandwidth management and resource allocation for the second active stream.

At step 912, listener states are merged and propagated from MSRP block to port P1.

At step 913, a PDU is transmitted from port P1 with MSRP.

At step 914, listener streams are declared to talker. A traffic flow of two active streams between talker and listener is established.

Figure 10:
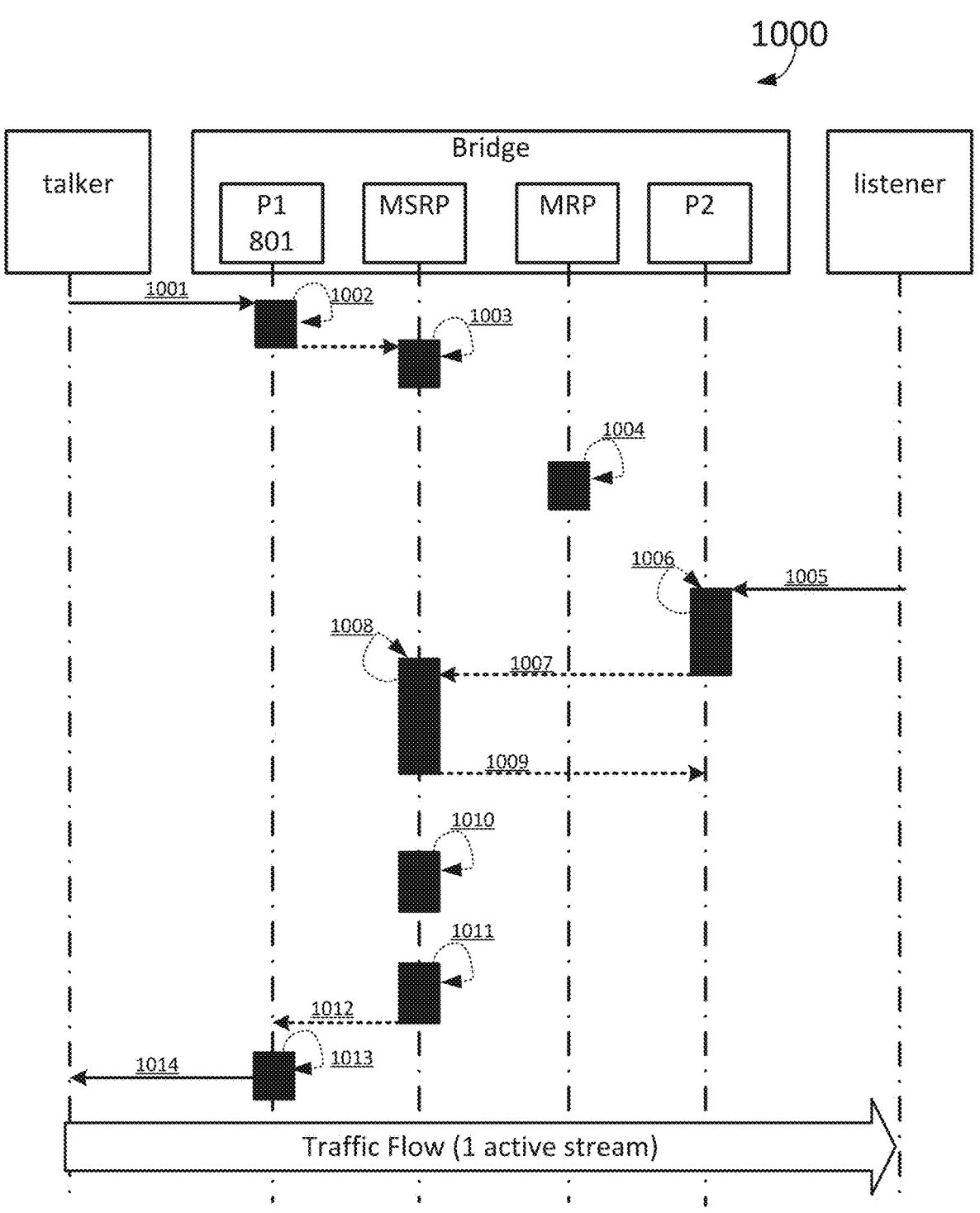
FIG. 10 is a simplified diagram illustrating process 1000 that involves transitioning from active stream to passive stream according to embodiments of the present invention.

FIG. 10 is a simplified diagram illustrating process 1000 of transitioning from active stream to passive stream according to embodiments of the present invention. This diagram is merely an example, which should not unduly limit the scope of the claims. One of ordinary skill in the art would recognize many variations, alternatives, and modifications. For example, process 800 illustrates traffic flow of one active stream that transitions from active stream to passive stream. As an example, one or more steps in process 800 may be added, removed, repeated, rearranged, modified, replaced, and/or overlapped, which should not unduly limit the scope of claims.

At step 1001, talker advertises n streams. For example, at this time, there are two active streams.

At step 1002, a MSRP PDU is received at port P1 with n talker streams.

At step 1002, MSRP block identifies two active streams, and n–2 passive streams.

At step 1003, MSRP block registers three attributes to declare to port P2. Two attributes are for the two active streams, and another attribute is an aggregate attribute for the n–2 passive streams.

At step 1004, MRP processes attributes for port P2.

At step 1005, listener indicates that it is leaving one of the active streams.

At step 1006, an MSRP PDU is received at port P2.

At step 1007, information related to the listener leaving an active stream is received at port P2.

At step 1008, MSRP block updates, where one active stream remains, one active stream is leaving, and there are n–2 passive streams.

At step 1009, MRP block removes the MRP attributed associated with the active stream that is transitioning to a passive stream.

At step 1010, the MSRP block updates stream distribution where there is a single active stream and n–1 passive streams (e.g., n–2 passive streams changed to n–1 passive streams). At this step, MSRP block processes bandwidth deallocation for the active stream transitioning into a passive stream.

At step 1011, listener states are merged, at MSRP block.

At step 1012, information related to stream attribute is propagated from MSRP block to port P1

At step 1013, a PDU is transmitted from port P1 with MSRP.

At step 1014, listener streams are declared to talker, for a traffic flow of a single active stream from talker to listener.

Figure 11:
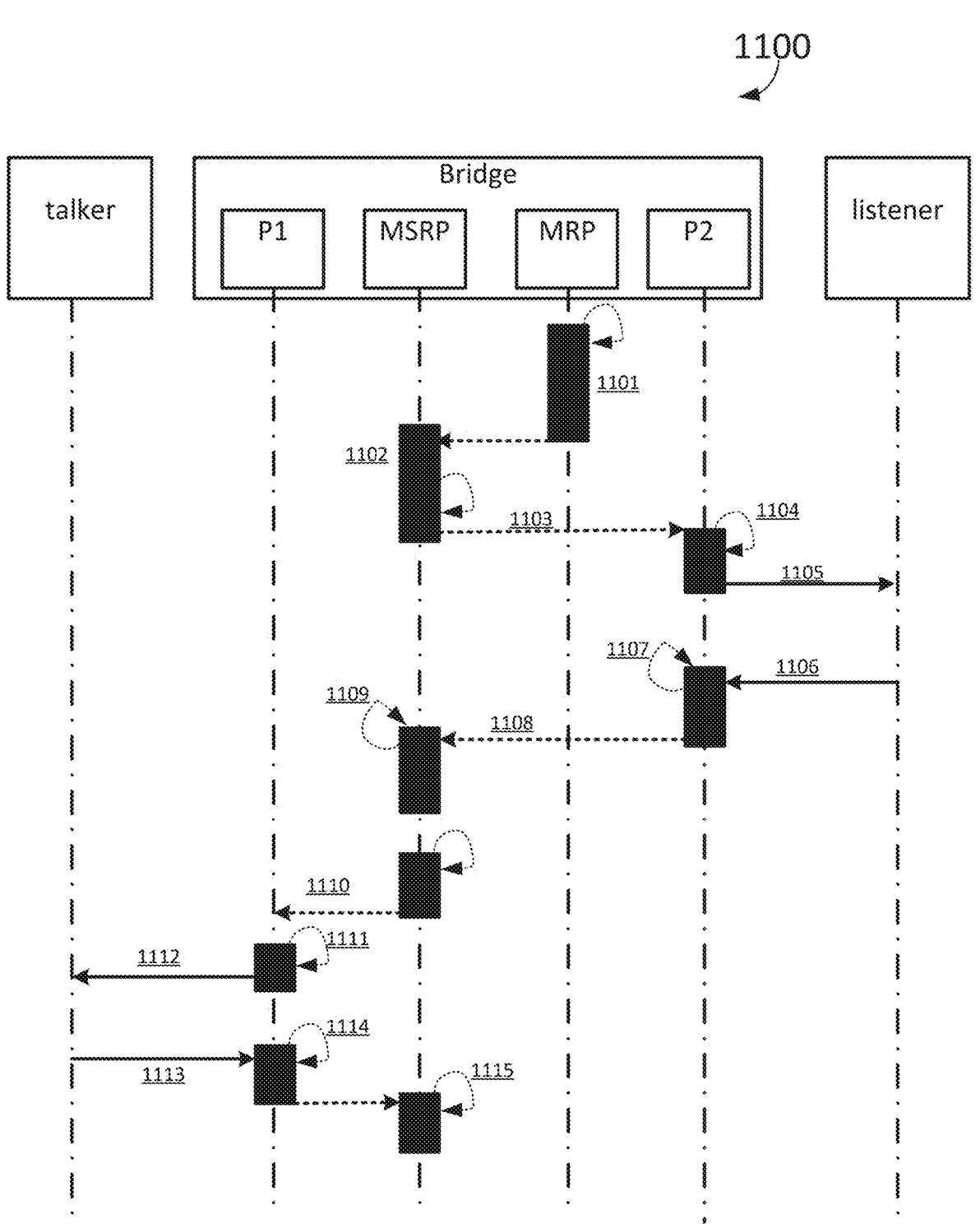
FIG. 11 is a simplified diagram illustrating cleaning process 1100 according to embodiments of the present invention.

FIG. 11 is a simplified diagram illustrating cleaning process 1100 according to embodiments of the present invention. This diagram is merely an example, which should not unduly limit the scope of the claims. One of ordinary skill in the art would recognize many variations, alternatives, and modifications. For example, process 1100 illustrates a leave-all processing. As an example, one or more steps in process 1100 may be added, removed, repeated, rearranged, modified, replaced, and/or overlapped, which should not unduly limit the scope of claims. For example, the term "cleaning process" refers to leave-all process where resources associated with non-active streams are reclaimed and cleared.

At step 1101, a leave-all timer expires at a predetermined time. At MSRP block, a leave-all notification is provided on port P2, where an attribute for active streams and another attribute (e.g., an aggregate attribute) for n–1 passive streams are provided.

At step 1102, leave-all processing for port P2 is performed at the MSRP block, for one active stream and n–1 passive streams.

At step 1103, Talk re-declaration is provided to port P2 for n streams, including both active and passive streams.

At step 1104, MSRP PDU is transmitted from port P2.

At step 1105, talker re-declaration is provided for listener for n streams following a Leave-All PDU that is transmitted from port P2 to listener.

At step 1106, listener indicates to port P2 that listener is ready.

At step 1107, MSRP PDU is received at port P2.

At step 1108, re-registration indication is transmitted from port P2 to MSRP block.

At step 1109, MSRP block processes one active stream and n–1 passive streams.

At step 1110, MSRP block initiates a leave-all process at port P1 for n streams.

At step 1111, port P1 provides an MSRP PDU.

At step 1112, listener re-declaration is provided for 1 active stream following a leave-all PDU that is transmitted from port P1 to talker.

At step 1113, talker advertises for n streams.

At step 1114, port P1 receives MSRP PDU.

At step 1115, MSRP block performs talker stream re-registration.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method comprising:
   receiving a plurality of streams from a communication interface;
   processing the plurality of streams to identify a first stream and a second stream and a third stream, the first stream comprising a first video data, the second stream comprising a second video data and the third stream comprising a third video data;
   determining a first status for the first stream, the first stream being associated with a first port, the first status comprising an active stream classification at the first port;
   storing a first attribute of the first stream;
   determining a second status for the second stream and the third stream, the second status comprising a passive stream classification at the first port; and
   storing a second attribute associated with the second status for the second stream and the third stream, the second attribute comprising an aggregated attribute representing a set of streams at the first port having the passive stream classification, the set including the second stream and the third stream.

2. The method of claim 1, wherein the first port comprises a first talker port or a first 2 port; and
   wherein the first status is associated with an active stream.

3. The method of claim 2, wherein the first stream is associated with a subscription to the first listener port, the first status indicating the subscription to the first listener port for the first stream.

4. The method of claim 1, wherein the second status indicates the second stream and the third stream not being subscribed.

5. The method of claim 1, further comprising aggregating information associated with the second stream and the third stream into the second attribute.

6. The method of claim 1, further comprising:
   managing the first attribute using a first state machine; and
   managing the second attribute using a second state machine.

7. The method of claim 1, further comprising:
   detecting the second stream being associated with a second port;
   associating the first status with the second stream, the first status indicating a subscription to a listener port; and
   storing a third attribute for the second stream.

8. The method of claim 1, further comprising grouping the second stream and the third stream based on the second status.

9. The method of claim 1, further comprising mapping a first attribute to the first stream and mapping the second attribute to both the second stream and the third stream.

10. The method of claim 1, further comprising associating the second status with the first stream.

11. The method of claim 1, further comprising associating the second status to the first stream upon determining that the first stream is no longer associated with the first port.

12. A network device comprising:

a switch comprising a first port and a second port;

a memory;

a processor coupled to the memory and configured to:

process a plurality of streams to identify a first stream and a second stream and a third stream;

determine a first status for the first stream, the first stream being associated with a first port, the first status comprising an active stream classification at the first port;

storing a first attribute of the first stream in the memory;

determine a second status associated with the second stream and the third stream, the second status comprising a passive stream classification at the first port; and storing a second attribute associated with the second stream and the third stream in the memory, the second attribute comprising an aggregated attribute representing a set of streams at the first port having the passive stream classification, the set including the second stream and the third stream.

13. The network device of claim 12, wherein the first port comprises a listener port in an audio-video bridging (AVB) network.

14. The network device of claim 13, wherein the second port comprises a talker port in the AVB network.

15. The network device of claim 14, wherein the switch is configured to transmit the first stream from the second port to the first port.

16. The network device of claim 12, wherein the first port and the second port operate according to a Multiple Stream Reservation Protocol (MSRP).

17. The network device of claim 12, wherein the first stream comprises a video and a definition, the definition being stored in the memory.

18. The network device of claim 12, wherein the switch is configured to perform a refresh within a predetermined period, the refresh causing a change of a status associated with the first stream.

19. A method comprising:

processing a plurality of streams to identify a first stream and a second stream and a third stream, the first stream comprising a first video, the second stream comprising a second video and the third stream comprising a third video;

determining a first status associated with the first stream, the first stream being associated with a first port, the first status comprising an active stream classification at the first port;

storing a first attribute of the first stream at a memory;

determining a second status associated with the second stream and the third stream, the second status comprising a passive stream classification at the first port;

storing a second attribute associated with the second stream and the third stream in the memory, the second attribute comprising an aggregated attribute representing a set of streams at the first port having the passive stream classification, the set including the second stream and the third stream;

detecting a first change associated with the first stream; and removing the first attribute from the memory.

20. The method of claim 19, further comprising:

detect the second stream being associated with a second port;

allocating memory for storing a third attribute associated with the second stream; and removing an association between the second attribute and the second stream.

* * * * *